May 2, 1933. M. K. BUCHANAN ET AL Re. 18,819

REFRIGERATING PAN

Original Filed Sept. 25, 1930 2 Sheets-Sheet 1

WITNESS

INVENTORS
M. K. Buchanan and
A. G. Horton,
BY
ATTORNEY

May 2, 1933. M. K. BUCHANAN ET AL Re. 18,819

REFRIGERATING PAN

Original Filed Sept. 25, 1930 2 Sheets-Sheet 2

WITNESS.

INVENTORS
M. K. Buchanan
A. G. Horton
BY
ATTORNEY

Reissued May 2, 1933 Re. 18,819

UNITED STATES PATENT OFFICE

MICHAEL K. BUCHANAN AND ALBERT G. HORTON, OF NORFOLK, VIRGINIA

REFRIGERATING PAN

Original No. 1,830,260, dated November 3, 1931, Serial No. 484,408, filed September 25, 1930. Application for reissue filed December 3, 1932. Serial No. 645,618.

This invention relates to refrigerating pans.

An object of the invention is the provision of a pan having a removable grid portion, the rear end of the same carrying a lever for positively elevating said end of the grid portion, while the opposite end of the grid portion is engaged by a bar eccentrically mounted on a gear which is revolved by a handle.

A further object of the invention is the provision of a refrigerating pan having a grid portion consisting of a plurality of longitudinally disposed plates movable through slots formed in transversely and removably mounted grid plates which are normally held in position by inturned lugs projecting from the side edges of the pan, means being employed for elevating the rear ends of the longitudinally disposed plates while an eccentric operated by a handle elevates the forward end of the plates.

A still further object of the invention is the provision of a refrigerating pan having a removable grid in which one face of the longitudinally disposed plates are inclined aiding in removing the cubes from the pan.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

Figure 1:
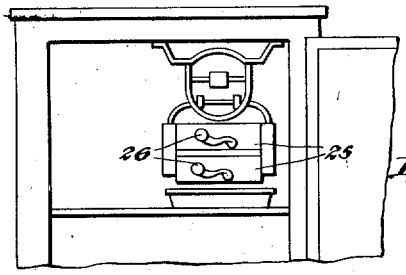
Figure 1 is a view in elevation of a refrigerator showing a plurality of refrigerating pans in position.
Figure 2:
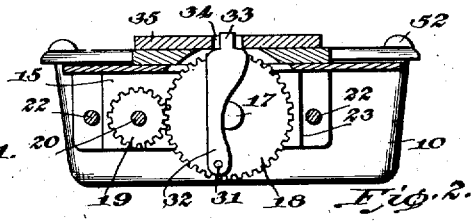
Figure 2 is a transverse section of a pan taken along the line 2—2 of Figure 3.
Figure 3:
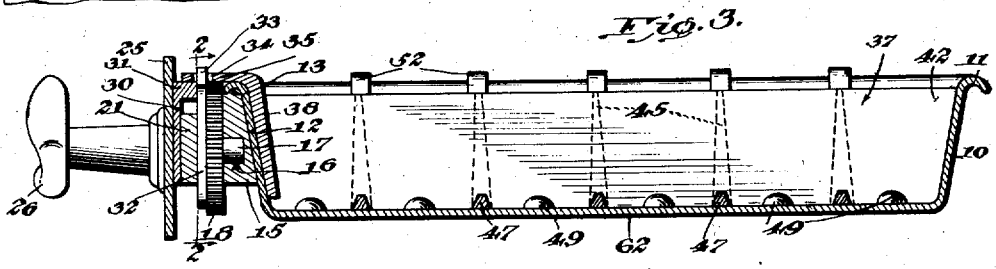
Figure 3 is a longitudinal vertical section.

Referring more particularly to the drawings 10 designates a pan formed of metal having a curved flange 11 at its upper end. The front wall 12 of the pan and the forward portion 13 of the flange is reinforced in a manner which will be presently explained.

A reinforcing block 15 is secured to the front wall 12 and a bearing 16 is formed in this block to receive an axle 17 formed in keeping with the gear 18. This gear meshes with a gear 19 secured to a shaft 20 which is mounted in bearings in the block 15 and a plate 21 held in place by threaded bolts 22. Spacing blocks 23 are located between the block 15 and the plate 21 and are clamped between said blocks by the bolts 22. The shaft 20 is extended through the plate 21 and a finishing plate 25 and is secured to a handle 26 which is adapted to rotate the shaft 20 and the gear 19.

A second plate 30 has a flange 31 secured to the block 15 and the plate 30 is secured in any approved manner to the plate 21 for aiding and reinforcing the front end of the pan in order to withstand the strain of the operating means about to be described.

It will be noted that the gear 19 meshes with the gear 18 which is revolved by the first mentioned gear through the operation of the handle 26. The gear 18 carries a pin 31 eccentrically disposed with respect to the axle 17 and a bar 32 which is pivotally mounted on the pin.

The free end of the bar is provided with a lug 33 adapted to be received within the passage 34 in the flange or lip 35 to which are secured longitudinally disposed removable plates 36 and 37 which form part of the grid. The plate 38 is secured to the forward end of the plates 36 and 37 and the lip 35 forms a continuation of the plate 38. The lip 35 and the plate 38 are formed of metal and are of sufficient thickness to withstand the strain when the plates 36 and 37 are being removed from the pan.

A lever 40 has a sleeve portion 41 which receives an axle 42 having the ends thereof mounted in the rear portion of the plates 36 and 37. A portion of the lever adjacent the sleeve 41 is curved downwardly as shown at 43 in order to provide a means for engaging the rear flange 11 of the pan 10 and this flange acts as a fulcrum when the lever is swung outwardly and downwardly for elevating the rear ends of the plates 36 and 37.

Transverse grids 45 are located in the pan and these grids are provided with slots 46 to receive plates 36 and 37. A portion 47 of the transverse grids 45 are located below the slots 46 and connect the sections of the transverse grids together. It will be noted from Figure 4 that the plates along the lower edge are provided with notches 48 into which the connecting portions 47 are adapted to seat when the plates are in the operative position within the pan 10. The opposite faces of the plates 36 and 37 along the lower edges as shown at 49 are provided with laterally projecting lugs which engage the lower edges of the cubes of ice for aiding in lifting the cubes after the cubes have been broken away from the pan.

The opposite faces of the plates are located in parallel relation. However, the central partition 50 of the grid has its side walls inclined at an angle so that the lower portion of the partition 50 is wider than the upper thereby reducing the lower portion of the cubes which will facilitate the removal of the cubes.

The partition 50 is secured to the transverse plates 45 and is removable as a unit with the transverse plates. Lugs 52 are secured to the flange 11 along the opposite longitudinal edges of the pan and these lugs project inwardly having a reduced free portion 53 which is adapted to be seated within complementary formed notches 54 in the opposite ends of the transverse plates 45. The lugs 52 fit in the notches and aid in maintaining the transverse plates in position. It will be noted, however, that the central partition 50 is of less length than the length of the inner portion of the pan so that the partition may be shifted longitudinally of the pan for releasing the lugs 52 from the notches 54 in the transverse plates 45. When this occurs the grid formed on the central partition 50 and the transverse plates 45 may be removed bodily from the pan.

It will be noted that the notches 48 and the connecting portions 47 are complementarily formed in order to provide a neat fit between the plates 30 and 37 and the transverse grid plates 45.

Figure 7:
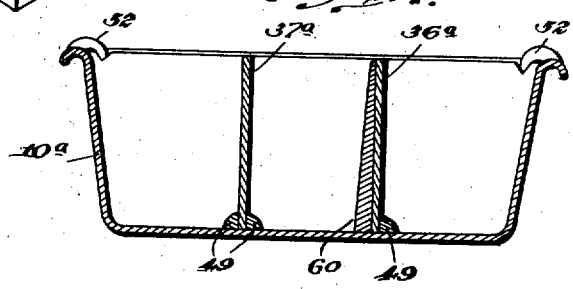
Figure 7 is a transverse vertical section and modified form of the invention.
Figure 8:
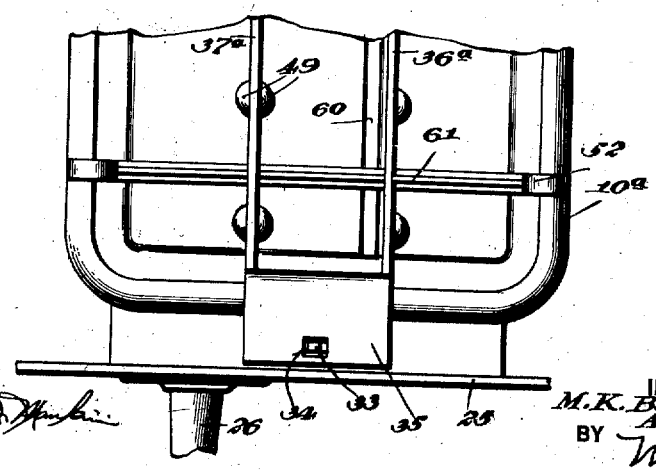
Figure 8 is a fragmentary plan view of the form shown in Figure 7.

In the modified form in Figs. 7 and 8 the central plate is omitted. However, a plate 60 is secured to the transverse grid plates 61 and is normally in flat contact with the inner face of the longitudinally disposed plate 36ª. This construction provides for the reduction of the water chamber which runs centrally and longitudinally of the pan. The inclined side walls of the pan 10ª cooperate with the plates 36ª and 37ª to reduce the water chambers upon opposite sides of the pan.

The plate 36ª is provided with a plurality of lugs or projections 49 which engage the lower edges of the cubes aiding in elevating the cubes when the plates 36ª and 37ª are raised. The plate 37ª, however, has spaced lugs 49 upon opposite faces and these lugs rest upon the bottom 62 of the pan.

The remaining portions of the pan and the grid section as well as the operating means for the grid section are identical in construction as shown in Figures 1 to 6 inclusive.

Figure 4:
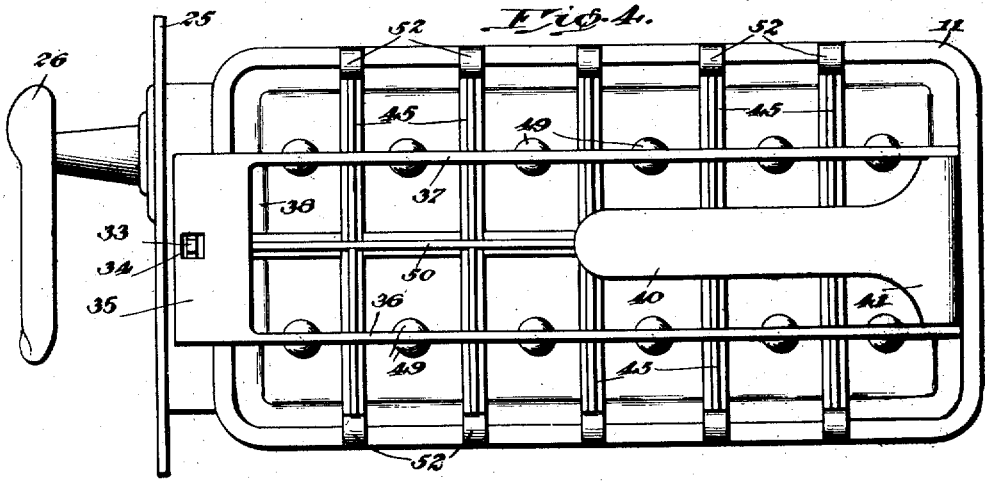
Figure 4 is a plan view of one form of the invention.
Figure 5:
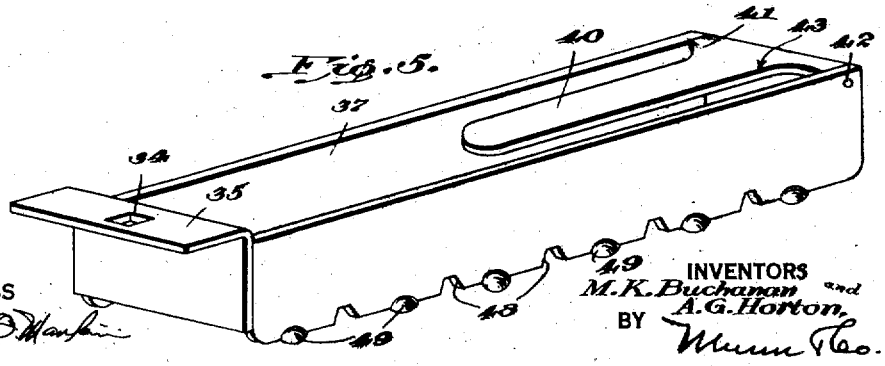
Figure 5 is a view in perspective of a removable grid portion of a refrigerating pan.
Figure 6:
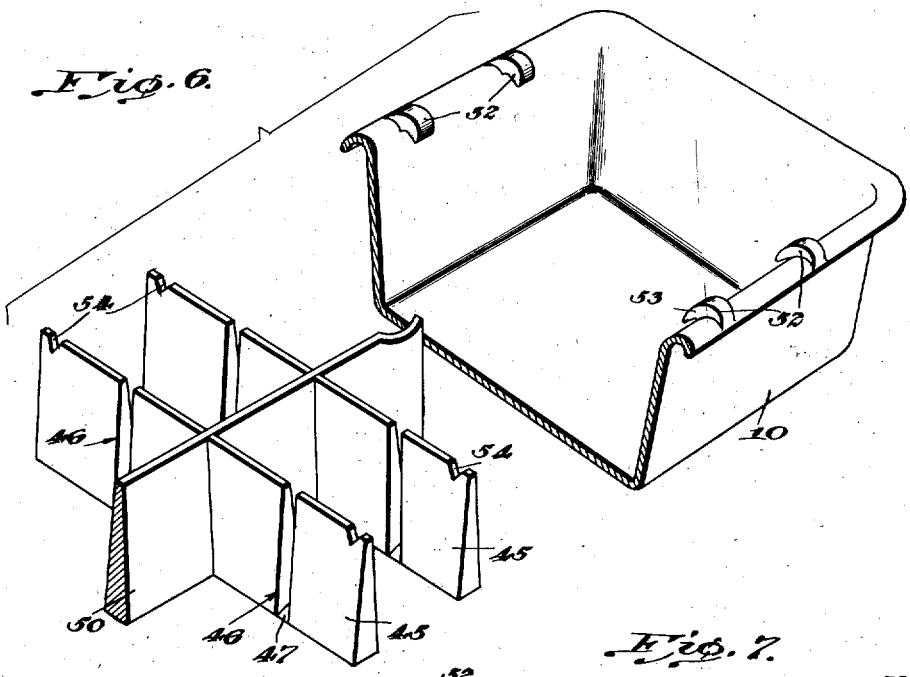
Figure 6 is a fragmentary view in perspective of the refrigerating pan showing the section of the grid therefrom.

The operation of my device is as follows: The grid section consisting of plates 36 and 37 are positioned within the pan 10 as shown in Figure 4 and the lever 40 is located in an approximately horizontal position. The lip 35 is secured to the ends of the plates 36 and 37 and is in the position shown in Figure 3. The pan is filled with water and is placed within the refrigerator.

When the water is frozen and the cubes have been formed it is only necessary to rotate the handle 26 whereby the gears 19 and 18 will be revolved causing the member 32 to be moved upwardly with the lug 33. As the member 32 is moved upwardly the lip 35 is likewise forced upwardly and thereby elevates the inner end of the plates 36 and 37. The lever 40 is then thrown upwardly and outwardly and as the portion 43 engages the flange 11 and the lever is forced downwardly the rear portions of the plates 36 and 37 will be elevated. When this is done the cubes will be broken away from the walls of the transverse plates 45 and elevated with the plates 36 and 37 due to the fact that the lugs 49 engage the bottoms of the cubes.

The inclined side walls of the pan 10 and the inclined walls of the central partition 50 facilitate the removal of the cubes.

While we have shown intermeshing gears for the operation of the elevating bar it will be appreciated that any form of means may be employed for operating the ratchet or jack for lifting the grid from the pan.

We claim:

1. A refrigerating pan comprising a pan, a removable grid section disposed longitudinally of the pan, means for elevating one end of the grid, the opposite end of the grid being provided with a flange, a gear mounted for rotation on the pan, means for rotating the gear, an eccentric pin on the gear, a bar pivotally mounted on the pin, means for guiding vertically the free end of the bar for engagement with the flange, vertical movement of the bar causing elevation of the flange and the contiguous end of the grid section.

2. A refrigerating pan comprising a pan, a removable grid section disposed longitudinally of the pan, means for elevating one end of the grid, the opposite end of the grid being provided with a flange, a gear mounted for rotation on the pan, means for rotating the gear, means actuated by the gear and engaging the flange for elevating said flange and the contiguous portion of the grid section.

3. A refrigerating pan comprising a pan, a removable grid section disposed longitudinally of the pan, means for elevating one end of the grid, the opposite end of the grid being provided with a flange, a gear mounted for rotation on the pan, means for rotating the gear, an oscillating and reciprocating means carried by the gear for engagement with the flange for elevating the flange and the contiguous portion of the grid section.

4. A refrigerating pan comprising a pan, a removable grid section disposed longitudinally of the pan, means for elevating one end of the grid, the opposite end of the grid being provided with a flange, a gear mounted for rotation on the pan, means for rotating the gear, a bar pivotally mounted on the gear at one side of the axis of the gear and reciprocated by the gear when rotated for elevating the flange and the contiguous portion of the grid section.

5. A refrigerating pan comprising a pan, a removable grid section disposed longitudinally of the pan, means for elevating one end of the grid, the opposite end of the grid being provided with a flange, a gear mounted for rotation on the pan, means for rotating the gear, means actuated by the gear and engaging the flange for elevating said flange and the contiguous portion of the grid section, transverse plates in the pan and provided with slots to receive the removable section, a plate extending longitudinally of the pan and secured to the transverse plates.

6. A refrigerating pan comprising a pan, a removable grid section disposed longitudinally of the pan, means for elevating one end of the grid, the opposite end of the grid being provided with a flange, a gear mounted for rotation on the pan, means for rotating the gear, means actuated by the gear and engaging the flange for elevating said flange and the contiguous portion of the grid section, a second grid section removably mounted in the pan and extending transversely of the first grid section, and means for retaining the second grid section in position.

7. A refrigerating pan comprising a pan, a removable grid section disposed longitudinally of the pan, a second grid section consisting of a plurality of plates located transversely of the pan, and a longitudinal plate connecting the transverse plates together, each plate having an arcuately-shaped notch at the opposite ends and along the exposed edges, arcuately shaped lugs secured to the side edges of the pan and projecting into the notches for retaining the plates against outward movement, the longitudinal connecting plate having less length than the length of the pan so that the second grid section may be moved longitudinally of the pan for releasing the notches from the lugs.

8. In an ice cube pan, a grid having a plurality of normally stationary walls and a plurality of normally movable walls, and means for raising said normally movable walls for breaking the cubes loose from the walls.

9. In an ice cube pan, a grid having a normally stationary grid member and a normally movable grid member, and means for raising said normally movable grid member for breaking the cubes loose from the grid members.

10. In an ice cube pan, a grid having a normally stationary grid member and a normally movable grid member, means for normally retaining said stationary grid member in fixed position, means on said movable grid member for supporting the cubes, and means for raising said movable grid member for breaking said cubes loose from the grid members.

11. In an ice cube pan, a grid having a normally stationary grid member and a normally movable grid member, means for normally retaining said stationary grid member in fixed position consisting of stops secured to the edge of the pan, means on said movable grid member for supporting the cubes, and means for raising said movable grid member for releasing said cubes.

12. In an ice cube pan, a grid having a normally stationary grid member and a normally movable grid member, means for normally retaining said stationary grid member in fixed position, means on said movable grid member for supporting the cubes, consisting of projecting flange members, and means for raising said movable grid member for breaking said cubes loose from the grid members.

13. In an ice cube pan, a series of interconnected walls, a second series of interconnected walls intersecting said first-named walls, means for normally retaining said first-mentioned walls in fixed position, and means for moving said second-named walls for releasing the ice cubes.

14. In an ice cube pan, a series of laterally extending upwardly projecting and interconnected walls, means for normally retaining said walls in a stationary position, a series of longitudinally extending upwardly projecting interconnected and normally movable walls intersecting said first-named walls, and means for moving said latter named walls for the release of the ice cubes.

15. In an ice cube pan, a grid having a normally movable grid member, a normally stationary grid member, means for moving said normally movable grid member for breaking the cubes loose from the grid members, and means for normally retaining said stationary grid member in fixed position, said means being adapted to release said normally stationary grid member when desired.

16. In an ice cube pan, a grid member adapted to engage the ice cubes, and means for moving said grid for breaking said cubes loose from the pan and grid member and comprising a lever operable between said grid member and said pan.

17. In an ice cube pan, a grid having a normally stationary grid member and a normally movable grid member, means for removably retaining said stationary grid member in fixed position, and means for raising said movable grid member for releasing the ice cubes from the pan.

18. In an ice cube pan, a grid having a normally stationary grid member and a normally movable grid member, means for retaining the normally stationary grid member against outward movement from the pan but permitting sliding movement of the grid member in one direction to permit release of the member for removal of said member from the pan, and means for raising and lowering said movable grid member for removing ice cubes from the pan.

19. In an ice cube pan, a movable grid member in the pan, means for elevating one end of the grid member for breaking the ice cubes loose from the grid and pan, lugs projecting laterally from the lower edges of the grid member, the upper surfaces of the lugs being rounded.

20. In an ice cube pan, a stationary grid member in the pan, a movable grid member in said pan and cooperating with the stationary grid member to form ice cube pockets, lugs projecting laterally from the lower edges of the movable grid member and disposed within a pocket, the upper faces of said lugs being rounded, and means for raising one end of the movable grid member.

21. In an ice cube pan, a grid having a normally stationary grid member and a movable grid member, the stationary grid member including a plurality of transversely disposed walls and a longitudinally disposed wall, the transverse walls having vertical slots, the movable grid member including longitudinally disposed walls disposed within the slots, and means for elevating the movable grid member.

22. In an ice cube pan, a grid having a normally stationary grid member and a movable grid member, the stationary grid member including a plurality of transversely disposed walls and a longitudinally disposed wall, the transverse walls having vertical slots, the movable grid member including longitudinally disposed walls disposed within the slots, means for elevating the movable grid member, the longitudinally disposed wall of the stationary grid member being tapered from the lower edge to the upper edge.

MICHAEL K. BUCHANAN.
ALBERT G. HORTON.